May 26, 1959   R. T. GLASS   2,887,855
AIR-FREEZE MACHINE
Filed May 7, 1956   6 Sheets-Sheet 1
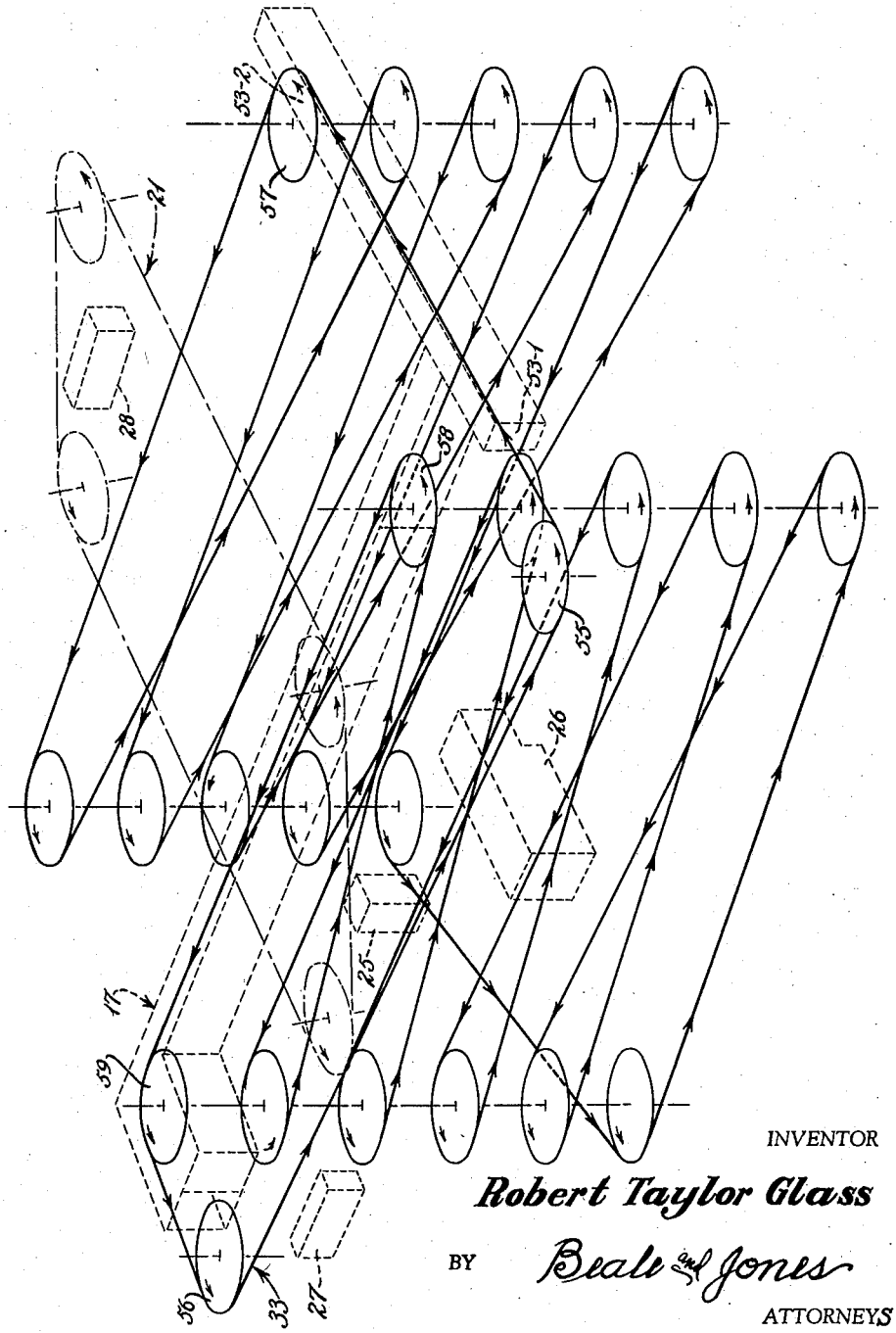
INVENTOR
Robert Taylor Glass
BY Beale and Jones
ATTORNEYS

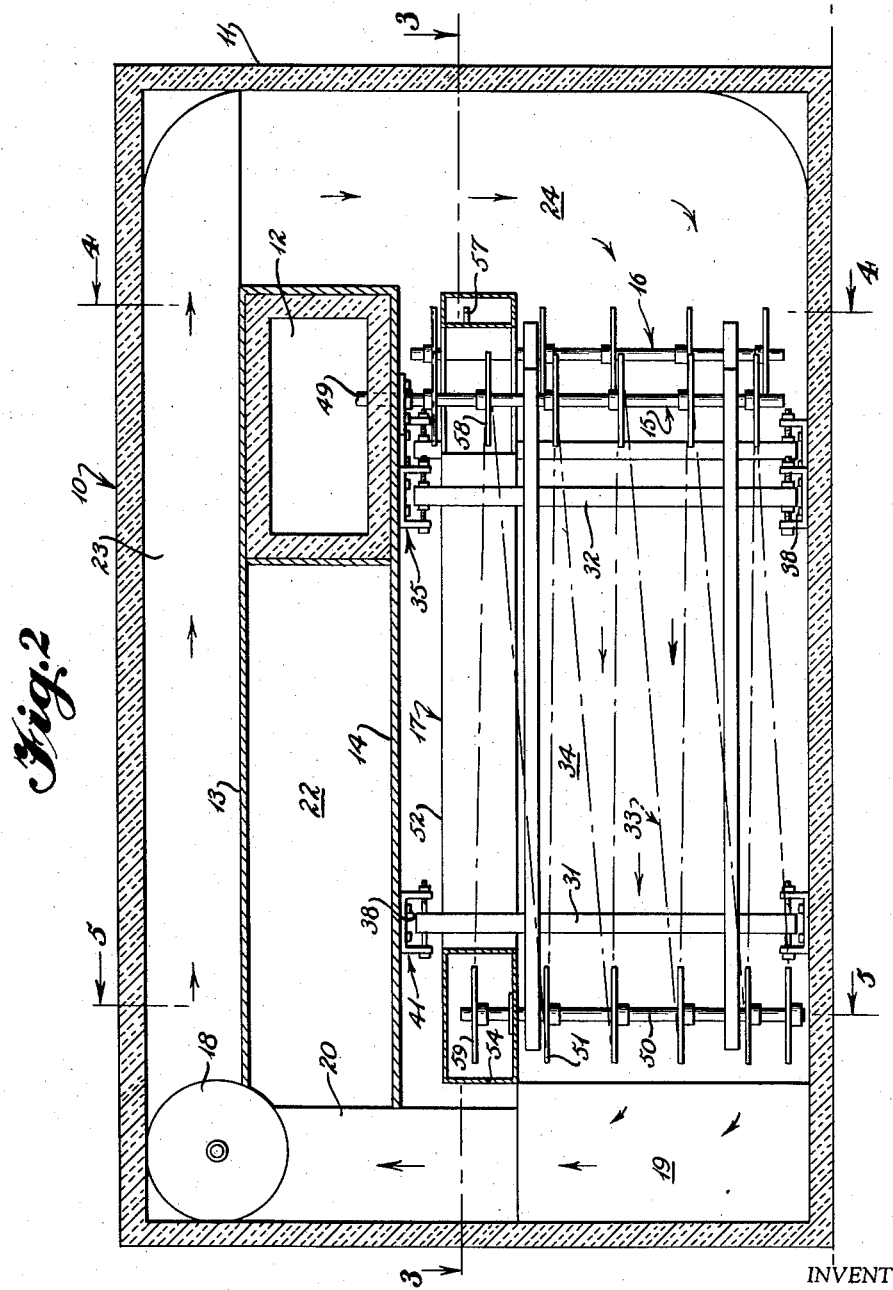

May 26, 1959 R. T. GLASS 2,887,855
AIR-FREEZE MACHINE
Filed May 7, 1956 6 Sheets-Sheet 3
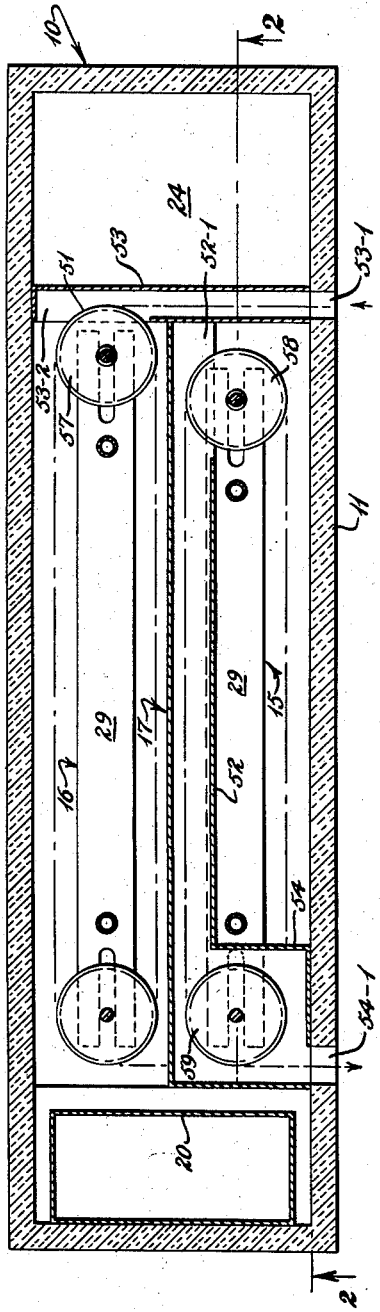
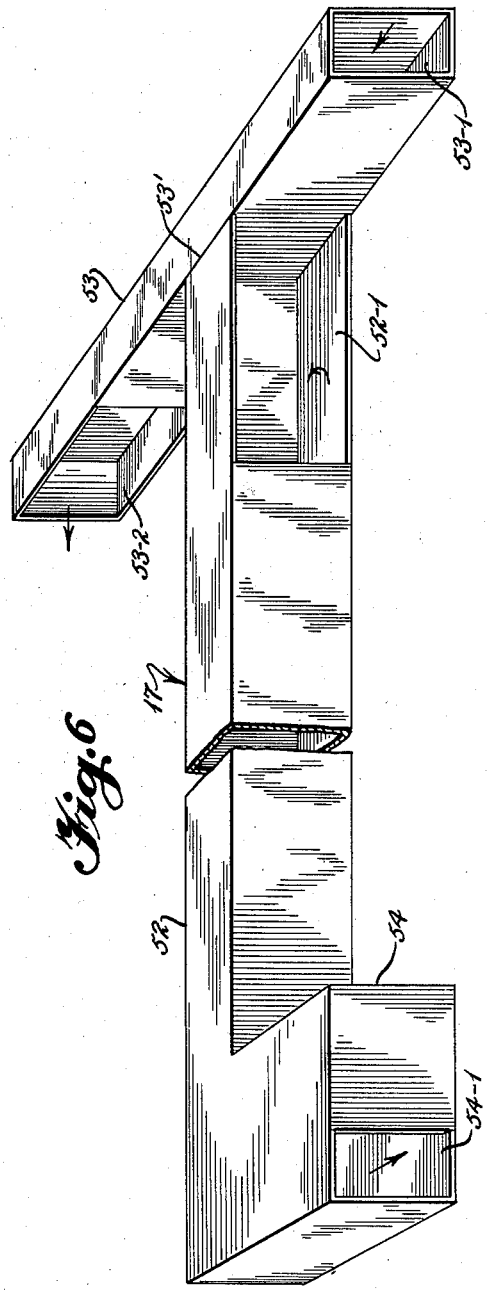
INVENTOR
Robert Taylor Glass
BY Beale & Jones
ATTORNEYS May 26, 1959

R. T. GLASS 2,887,855

AIR-FREEZE MACHINE

Filed May 7, 1956

INVENTOR
*Robert Taylor Glass*

BY *Beale and Jones*

ATTORNEYS

May 26, 1959 R. T. GLASS 2,887,855
AIR-FREEZE MACHINE
Filed May 7, 1956 6 Sheets-Sheet 5
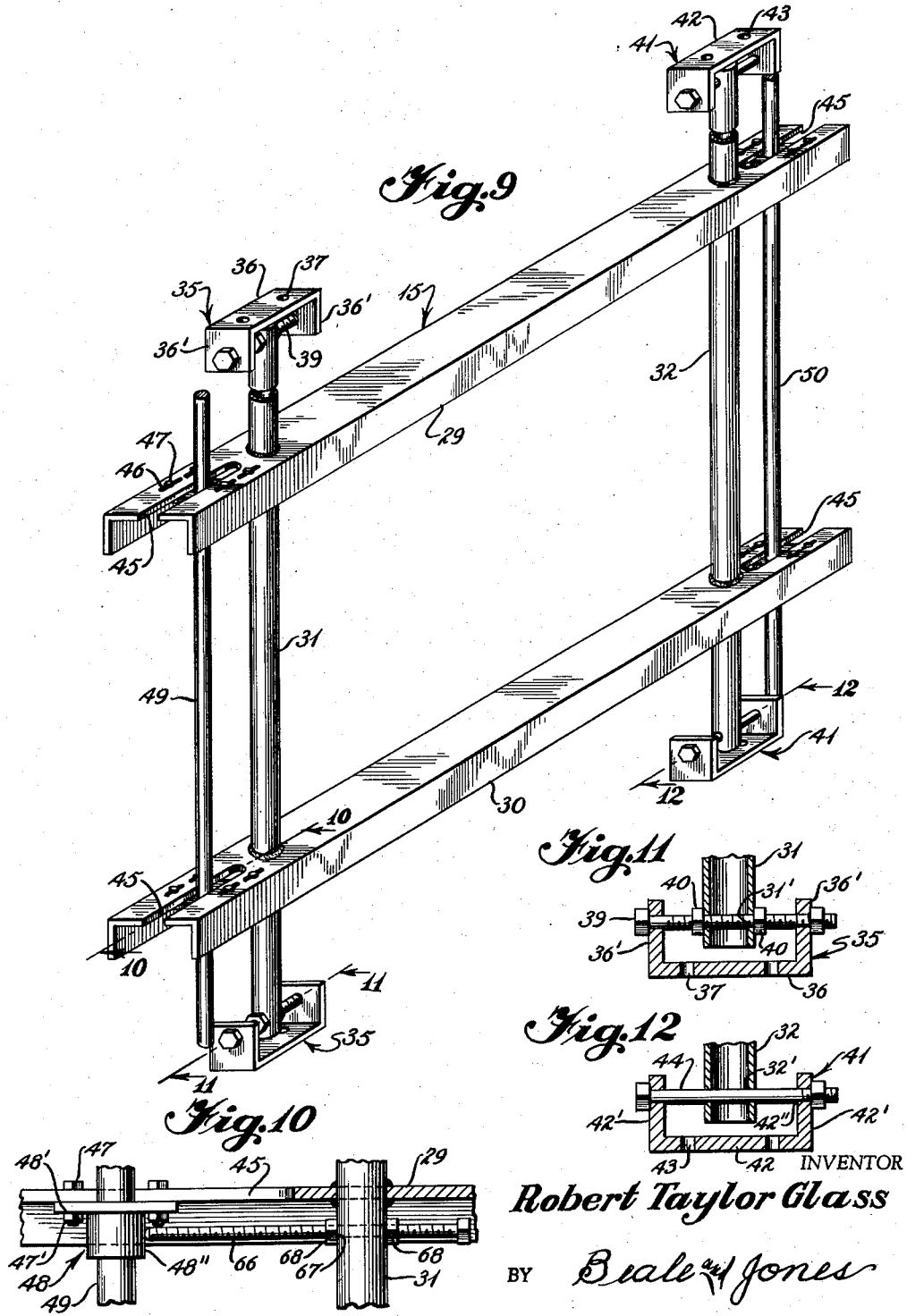
INVENTOR
Robert Taylor Glass
BY Beale and Jones
ATTORNEYS May 26, 1959　　　　R. T. GLASS　　　2,887,855
AIR-FREEZE MACHINE Filed May 7, 1956　　　　　　　　　　6 Sheets-Sheet 6

INVENTOR
Robert Taylor Glass
BY Beale and Jones
ATTORNEYS

United States Patent Office 2,887,855
Patented May 26, 1959

2,887,855

AIR-FREEZE MACHINE

Robert T. Glass, Austin, Tex.

Application May 7, 1956, Serial No. 583,134

7 Claims. (Cl. 62—380)

My invention is directed to improvements in food freezing machines particularly the shaft support structure for an endless conveyor therein and to isolating the inside from the outside of the confection machine at conveyor points. This is a continuation-in-part of my copending application Serial No. 398,100, filed December 14, 1953.

In freezing machines of the air-freeze type wherein an endless conveyor chain carries the food molds and articles to be frozen through the chilling and freezing zone there are radical temperature variations which cause the chain to contract and expand as well as the supports therefor. One of the features of my invention is the mounting of the shaft supports for the endless conveyor chain to overcome and compensate for these temperature changes.

Also in freezing machines of the endless conveyor type where the conveyor passes through chilling zones to enter and leave the machine there are necessarily openings to admit the chain and thus a tendency for exchange of warm or cold air through these openings. I have devised a duct seal unit for the endless conveyor chain wherein the openings are isolated and a balance is struck between the inside and outside of the machine so as to reduce to a minimum any interchange of heat and cold.

It is an object of my invention to provide for a conveyor chain mounting in an air-freeze type of machine wherein contraction and expansion of the chain, the sprockets and framework are freely permitted and provided for.

Another object of my invention is to provide for supporting shafts which carry sprockets and about which and endless chain is led in bearings spaced in from the ends of the shaft so that the sprockets placed on the shaft each side of the bearings have a small bending moment action on the shaft.

A further object of my invention is to provide a sealing duct unit for the endless conveyor chain in an air-freeze machine wherein the inside and outside pressures are balanced to reduce any exchange of heat from without and cold from within.

Another object of my invention is to provide a unitary shaft support structure which may be prefabricated and shipped as a unit.

A still further object of my invention is to provide a preassembled duct seal unit for an endless chain conveyor system for sealing off or isolating the inside from the outside of the machine at the openings for the conveyor chain.

Still further objects and the entire scope of applicability of the present invention will become apparent from the detailed description given hereinafter. It should be understood, however, that detailed description and specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the nature and scope of my invention reference may be had to the drawings and the description in the specification.

Fig. 1 is a diagrammatic isometric representation of the conveyor chain, cross conveyor chain units of the freezing machine and showing of the duct seal unit for endless conveyor;

Fig. 2 is a vertical cross sectional elevation of the machine with the front removed;

Fig. 3 is a cross sectional plan view along section line 3—3 of Fig. 2;

Fig. 6 is an isometric view on an enlarged scale of the duct sealing unit for the endless conveyor;

Fig. 9 is an isometric enlarged view of one of the unit shaft support members;

Fig. 10 is a vertical cross sectional mounting of a spacer tube and adjacent conveyor shaft with its bearing as viewed along line 10—10 of Fig. 9 on an enlarged scale;

Fig. 11 is a vertical cross section of an end mounting unit for one of the spacer tubes as viewed along line 11—11 of Fig. 9 on an enlarged scale;

Fig. 12 is a vertical cross sectional view of the expansion mounting support for the movable end of the unit shaft support shown along line 12—12 of Fig. 9 on an enlarged scale;

Throughout the description like reference numerals refer to similar parts.

Figure 4:
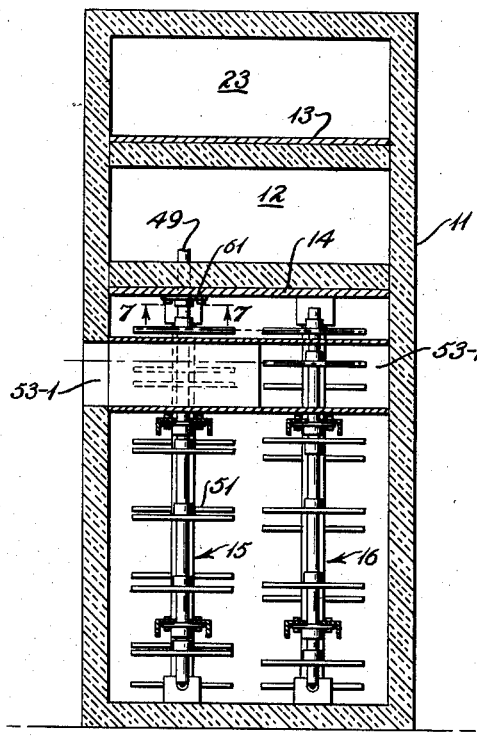
Fig. 4 is a vertical cross section along line 4—4 of Fig. 2.

Reference to Figure 2 shows a confection machine 10 comprised of a casing 11 having within a housing for power operator 12, upper horizontal baffle 13, lower horizontal baffle 14, a front unit shaft support 15 and a rear unit shaft support 16 mounted therein. Casing 11 is insulated as this is a cold air type of freezing machine for confections and other foods or articles and includes a duct seal unit 17 for the endless conveyors, a cold air blower 18 in the upper left-hand corner of the machine as shown in Fig. 2 to circulate the cold air which passes over the cooling coils at 19 up through cold air duct 20, through the top air chamber 23, across the top of the machine, thence downwardly through the down-flowing air chamber 24 as shown by the arrows and then through the freezing zone 34 where there is a maze of the conveyor chain passing over the front and rear unit shaft supports 15 and 16 back to the cooling coils 19 for recooling.

Figure 13:
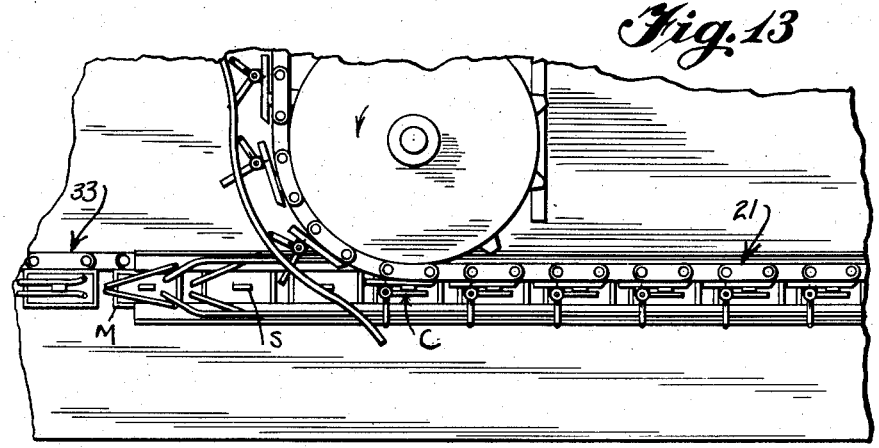
Fig. 13 is a fragmentary plan view of the conveyor chain and cross over conveyor chain thereabove.
Figure 14:
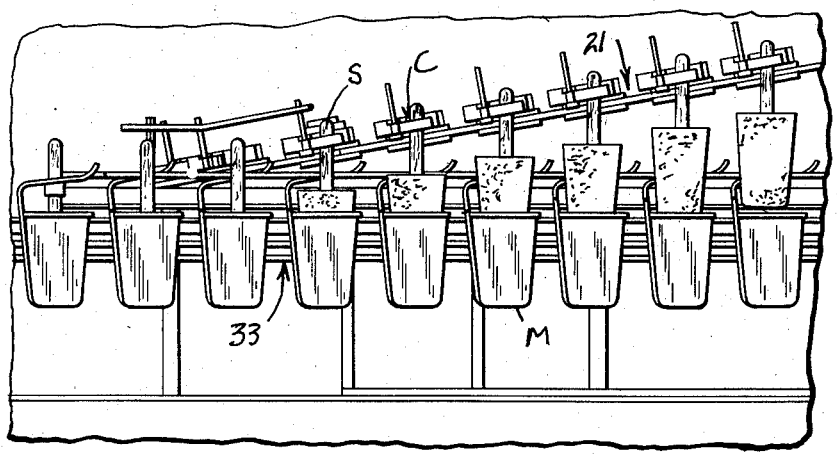
Fig. 14 is a front elevation of the apparatus depicted in Fig. 13.
Figure 15:
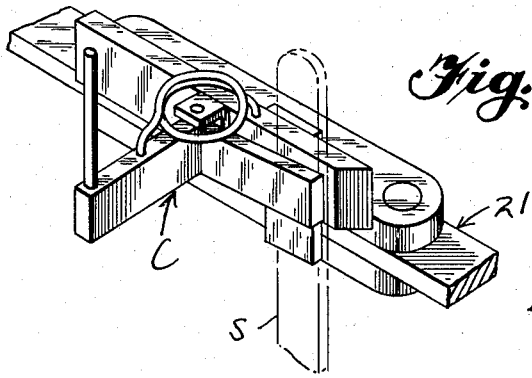
Fig. 15 is an isometric view of a gripper on the cross over conveyor chain.

Figure 1 shows a cross conveyor chain 21 which travels in cross conveyor chamber 22 that is also cooled by the chilled air passing over horizontal baffle 13 and under horizontal baffle 14. This cross conveyor 21 has a reach thereof as shown in Figures 1, 13 and 14 at the front end which passes at an inclined angle over a reach of the endless conveyor chain generally indicated at 33 so as to pull frozen articles from molds M shown in Figures 13 and 14 carried by the conveyor chain 33 and having upstanding sticks frozen therein which are grasped by clamp means on the conveyor chain 21 as fully disclosed in applicant's application Serial No. 398,100, filed December 14, 1953. After the molds have the frozen articles pulled therefrom by conveyor chain 21 and clamps carried thereby, the empty molds carried by conveyor chain 33 pass under the filler 25, by the sticker 26 where sticks are inserted therein and suitably held by clamps associated with the mold, thence into the main freezing zone 34 through the duct seal unit 17 as will hereinafter be described in more detail, and then out of the machine and past a heater 27 where the molds are raised in temperature so as to free the frozen articles from the walls thereof and then back under the reach of the cross conveyor chain 21 where the articles are pulled from the molds as indicated above.

Unitary shaft support structure

In Fig. 9 I have shown the front unit shaft support generally indicated at 15. The rear unit shaft support 16 is of similar construction but slightly longer as illustrated in Fig. 2. Top and bottom channel members 29 and 30 extend horizontally and are secured together by spaced apart vertical tube members 31 and 32. The channel members 29 and 30 are spaced in from each end of the first and second spacer tubes 31 and 32 about one-third the length of the tube and secured to the tubes as by welding. The channel members 29 and 30 are apertured to receive the tubes 31 and 32. The first spacer tube 31 which extends vertically is supported at each end by means of a U-shaped bracket assembly generally indicated at 35. This bracket assembly 35 comprises a short length of channel 36 having apertures in the web thereof as indicated at 37 to receive bolts 38, see Fig. 2, which secure it to the base of the machine and to the baffle 14. The legs 36' of the channel 36 are apertured and threaded to receive a threaded bolt 39 which passes through an aperture 31' adjacent the ends of the first spacer tube 31 as best shown in Fig. 11. Nuts 40 are received at each side of the tube 31 on the bolt 39 to secure the vertical spacer tube 31 in adjusted position.

The free end of the unit shaft support 15 as shown at the right-hand end of Fig. 9 is allowed to expand and contract by the means presently to be described.

The second or movable spacer tube 32 supporting the right-hand ends of the channel members 29 and 30 as by the welding there shown in Fig. 9 extends at its ends about one-third beyond the channel member 29 and 30 as does the tube 31. The ends of the tube 32 are similarly mounted to the ends of tube 31 except that they are allowed to shift in their mounting upon expansion or contraction of the channel members 29 and 30. A U-shaped bracket assembly for the movable spacer tube 32 is generally indicated at 41. This comprises a short section of channel 42 having apertures 43 in the web thereof for receiving securing bolts 38, see Fig. 2, which secure it at the bottom to the casing 11 and at the top to the baffle 14 or other suitable support structure within the casing 11. The upstanding legs 42' on channel 42 are apertured as at 42" to receive bolts 44 which pass through apertures 32' formed in the ends of the tube 32 so that the tube 32 freely moves on the bolts 44 at each end. Thus, any expansion or contraction of the unit shaft support 15 will be permitted by means of the slidable mounting of the ends of the second spacer tubes 32 on the bolts 44 supported in the brackets 41. The top and bottom channel members 29 and 30 have formed in the ends thereof elongated open ended slots 45 which extend in from each end in close spaced relation to the respective spacer tubes 31 and 32. Adjacent these slots 45 and extending parallel therewith are four longitudinally extending slots 46 which are bolt receiving slots for the bolts 47 that secure plate and bearing assemblies generally indicated at 48, see Fig. 10, which serve as bearings and guides for first and second sprocket shafts 49 and 50. These bearing and plate assemblies 48 have a plate 48' and a bearing 48" secured thereto. The plates 48' are apertured to receive the bolts 47 which are adapted to be moved along slots 46 to an adjusted position and then secured by the units 47'. Thus, the shafts 49 and 50 are assembed in the unit shaft support 15 and expand and contract with the channel members 29 and 30. The channel members 29 and 30 are supported at a fixed end by the first support member 31 and at the movable or free end by the second support member 32 for longitudinal expansion. In fabricating the assemblies steel of like characteristics especially as respects coefficient of expansion and contraction is used throughout and in the conveyor chain so that substantially uniform expansion and contraction of the parts takes place. Channel members 29 and 30 and their associated supports and shafting are made of material having a coefficient of expansion like that of the endless conveyor chain 33 associated therewith. Thus, on subjection of the materials to temperature changes like expansion and contraction takes place. Expansion of the parts is accomplished by having one end of the chain support members fixed while the other end is floatingly supported. The rear unit shaft support 16 is of like construction to that just described above for the front unit shaft support 15 but is of slightly greater length.

Figure 5:
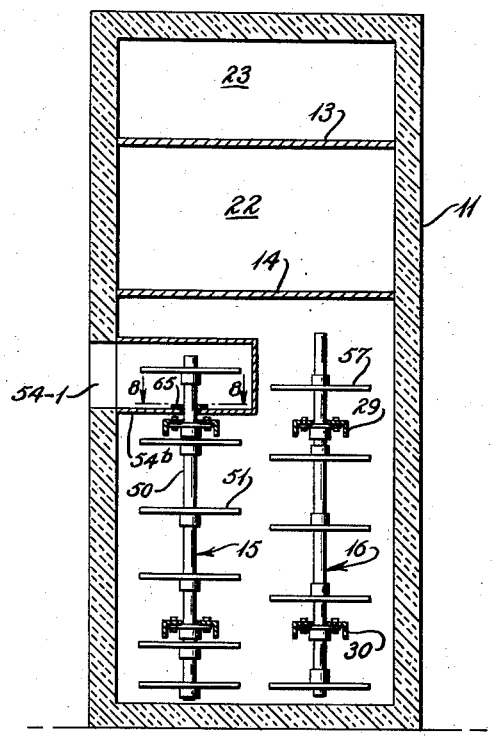
Fig. 5 is another vertical cross sectional view along line 5—5 of Fig. 2.

In Figs. 2, 4, and 5 the shafts 49 and 50 have mounted thereon spaced apart sprockets 51 which are offset along shaft 49 with respect to the mounting on shaft 50 so as to receive and accommodate the endless conveyor chain 33 shown diagrammatically. The sprockets on the shafts 49 and 50 are positioned each side of the bearings 48 and provide by such positioning of the bearings for short bending moments when the chain is pulled over the sprockets. This reduces the bending and twisting action along the shafts 49 and 50. Shaft 49 extends upwardly through the baffle 14 shown in Figs. 2 and 4 into the housing for the power operator (not shown) where it is rotated in a step by step fashion and in turn imparts motion to the conveyor chain 33 in a step by step manner. While baffles 13 and 14 are shown in front of the structure of the machine there may be additional framework (not shown) adapted to support the unit shaft supports 15 and 16. The cross chain conveyor space 22 receives its chilling by the air passing over the baffle 14 and under the baffle 14. However, the cross chain 21 and the main conveyor chain 33 are considered as extending both within the same chilling space and are chilled by the same medium. The baffles 13 and 14 afford a more even distribution of the air and a free flow thereof in its cooling circuit as best illustrated in Fig. 2.

In Fig. 10 a typical bearing 48 is shown mounted on channel member 29 and it is adjustably positioned therealong in the mounting slots 45 and 46 by the adjusting screw member 66 which is threadedly received in a threaded aperture 67 in adjacent tubular support 31. Lock nuts 68 received on threaded screw 66 hold the screw 66 in adjusted position. These screws 66 are positioned in the support tubes 31 and 32 adjacent each bearing 48 supporting shafts 49 and 50.

Duct sealing unit for endless conveyor

Reference to Fig. 6 shows the duct sealing unit 17 with a main longitudinal section 52, a first transfer section 53, and a second transfer section 54. The first transfer section 53, as are the other sections, is of generally square shape configuration in cross section and of sufficient size to accommodate one reach of the chain 33 as it carries the molds thereon as referred to in parent application Serial No. 398,100, filed December 14, 1954. The first transfer section 53 is rigidly secured at the right-hand end of the main section 52 as at 53' but has no communication with that section 52. Section 53 has an in-running opening 53-1 and an out-running opening 53-2 which opens into the main chilling space 34. The opening 53-1 receives the chain 33 which has passed over first outside sprocket 55 which has received the chain from second outside sprocket 56 as the chain leaves the machine.

The first inside sprocket 57 is located in the duct opening 53-2 and is the top sprocket on the rear unit shaft support 16. This first transverse section 53 and the openings 53-1 and 53-2 take care of the admission of the conveyor chain 33 into the casing 11.

The main longitudinally extending section 52 of the duct seal 17 has formed therein an opening 52-1 to receive the chain and the next to last inside sprocket 58 about which chain 33 travels in leaving the freezing zone 34 of casing 11. The chain then passes through the main longitudinally extending duct portion 52 to and about the last inside sprocket 59 located at the juncture of the duct sections 52 and 54. After the chain leaves last sprocket 59 it passes out through the second transverse section 54 and out outlet opening 54-1.

It will be observed that the path of the air within the casing 11 at no time moves into or from the various duct openings. No air can enter or leave the machine and opening 53-1 without passing through opening 53-2. Openings 52-1 and 53-2 are relatively close together within the freezing zone 34 and no air can enter or leave the machine and freezing zone 34 therein except through them and very little air enters or leaves the machine. The moving air passes over the top and bottom of duct section 53 in the direction that opening 53-2 faces and air also passing over the top and bottom of sections 53 and 52 passes transversely past opening 52-1. Openings 52-1 and 53-2 being close together and within casing 11 are subject to the same interior pressure. The other two openings 53-1 communicating with 53-2 and 54-1 communicating with 52-1 are subject to the still air and its pressure at the outside of the machine and outside of casing 11. The corresponding pairs of openings are substantially the same area in cross section. Thus, there is established a sealing off of the inside of casing 11 from the outside by positioning of the inside openings 53-2 and 52-1 so as to be subject to a minimum effect of air flow within the casing and at the same time the openings 53-1 and 54-1 to the outside of the casing 11 communicating respectively with inside openings 53-2 and 54-1 provide a pressure balancing effect so that virtually there is little or no movement of air in the sections of the sealing duct 17 for the conveyor chain and this results in a minimum of exchange of inside for outside air as respects the machine.

Figure 7:
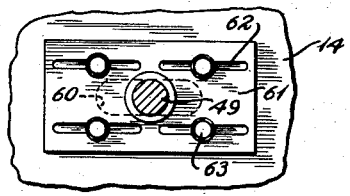
Fig. 7 is a view of the baffle mounting plate for one of the drive shafts as viewed along line 7—7 of Fig. 4 on an enlarged scale.

The sealing duct 17 and the front and rear shaft supports 15 and 16 are assembled so that expansion and contraction of all parts is accommodated. Reference to Figures 4 and 7 shows an arrangement useful in assembling the conveyor portions of the machine. Baffle plate 14 has an elongated slot therein extending in the direction of the slots 45 and 46 in the channel members 29 and 30 and receives power shaft 49 which extends up into chamber 12. Closure plate 61 is apertured to receive the shaft 49 and is provided with elongated slots 62 which match with the spacing of slots 46 in the channel members 29 and 30. These slots 62 receive tap screws 63 that are threadedly received in suitable threaded apertures in baffle 14. Thus, the closure plate 61 overlies the slot 60 and seals the housing 12 for power operator from the main freeze zone 34 therebelow.

Figure 8:
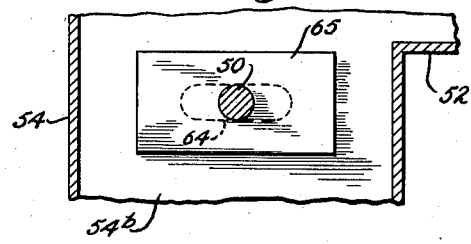
Fig. 8 is a baffle plate mounting for another one of the conveyor shafts as shown along line 8—8 of Fig. 5 on an enlarged scale.

In Figures 5 and 8, shaft 50, a longitudinally movable shaft with the end of unit 15, extends upwardly through an elongated slot 64 in bottom panel 54b of the duct section 54. A closure plate 65 having an aperture therein which receives shaft 50 rests on the top of the bottom panel 54b of the duct section 54 and slides with any longitudinal movement of shaft 50 to cover the elongated slot 64. Any expansion or contraction of the sealing unit generally indicated at 17 can take place through the slot 64 as respects the shaft support units 15 and 16.

I claim as my invention:

1. In combination in a food freezing machine of the cold air type, a housing, an endless conveyor chain, front and rear unitary shaft support members mounted therein having spaced apart sprockets about which an endless conveyor chain is trained, a first outside sprocket about which said chain travels in entering said housing to a first inside sprocket on the rear unitary shaft support member, a next to last inside sprocket and a last inside sprocket on said front unit shaft support over which said chain travels in leaving said housing, a second outside sprocket about which said chain travels after leaving said casing and a duct seal unit for the endless conveyor mounted in said casing for sealing the inside from the outside of the housing to prevent exchange of air from within and without said casing, said duct seal unit comprising a main section, a first transverse section affixed to one end of but not in communication with said main section and extending substantially transverse thereto, and a second transverse section attached to and in communication with said main section, said first transverse section having an inlet opening exposed to the air outside said casing to receive the first reach of said chain with said casing from adjacent said first outside sprocket and a second opening at the other end adjacent said first inside sprocket exposed to the air inside said casing, said last mentioned opening facing in the direction of the cold air movement in said machine so that cold air moves thereby, but not therein, said second transverse section being affixed and in communication with the main section at the other end thereof, said main and second transverse sections housing the last reaches of said chain as it leaves said casing, said main section having an opening therein adjacent said next to last inside sprocket and adjacent the end thereof proximal to said first transverse section with the axis of the opening extending perpendicular to the axis of said second opening in the first transverse section so that air flow in said casing moves therepast but not therein said second opening in the first transverse section and the opening in the main section being close to each other within the casing and subject to the substantially same pressure and temperature conditions within said casing, said second transverse section housing the last inside sprocket and the last reach of the chain as it leaves said casing and having an opening exposed to the air outside said casing, said second opening in the first transverse section and the opening in the main section being exposed to the same pressure conditions and balancing each other while said inlet opening in the first transverse section and the opening in the second transverse section are exposed to the same pressure outside said casing thereby balancing each other whereby the minimum amount of inside and outside air is exchanged through said conveyor chain sealing duct.

2. In a food freezing machine, a housing, a pair of unitary shaft support members mounted therein, having spaced apart sprockets about which an endless conveyor chain is trained, each of said unitary shaft support members comprising a pair of vertical extending horizontally spaced apart support members, a top horizontally disposed member fixed at a point spaced in from the ends thereof to said vertical support members at a position approximately one-third the length of the vertical support members from the top ends thereof, a bottom horizontal member parallel to said top member fixed at a point spaced in from the ends thereof to said vertical support members at a position approximately one-third the length of the vertical support members from the bottom ends thereof, one of said vertical support members being fixed at its ends to said housing, the other of said vertical support members being slidably supported at its ends in said housing for horizontal movement on contraction and expansion of said unit, first shaft bearing members mounted on the top and bottom horizontally extending members intermediate an end and the adjacent vertical support member, a first shaft mounted in said first bearing members for free rotation, second shaft bearing members mounted on the top and bottom horizontally extending members intermediate the other end and the other vertical support member, a second shaft mounted in said second bearing members, spaced apart sprockets mounted on said shafts adjacent the ends thereof and intermediate said top and bottom horizontal members and an endless chain trained over said sprockets, whereby any sprocket on the shafts is positioned relatively close to a bearing support for the shaft and the bending moment between sprockets and bearings along said shaft is reduced as compared with the bending moments of sprockets and bearings had the bearings been positioned at each end of each shaft.

3. A food freezing machine of the cold air type comprising, in combination, a housing, support structure in said housing, a cold air supply means, a freezing zone in said housing, means to circulate said cold air in the housing, a pair of unitary shaft support members mounted in said housing and in said freezing zone therein and attached to said support structure, each of said unitary shaft support members having a pair of vertically extending shafts and spaced apart sprockets thereon, means for securing one end of each unit to the support structure, means for supporting the other ends of each unit for sliding movement to accommodate for expansion and contraction of said units and an endless conveyor chain to be carried thereby, a pair of sprockets outside of said housing and adjacent one of said unitary shaft support members therein, an endless conveyor chain trained over said last-named sprockets and the sprockets of said unitary shaft support members, a pair of vertically spaced baffles positioned in said housing about said unitary support members and attached to said support structure, support sprockets at each end of said baffles, a cross conveyor chain extending between said baffles and supported by said last-named sprockets and extending generally transverse to the direction of said unitary shaft support members, said cross conveyor chain being arranged to have a reach thereof passing at an inclined angle to a reach of said first conveyor chain extending between said outside sprockets supporting said last-named chain, means on said first chain for carrying articles to be frozen, means on said cross conveyor chain for grasping said articles on the first conveyor chain and holding them on said cross conveyor chain as said reach of the latter passes over said reach of the first conveyor chain, and duct sealing means surrounding portions of said pair of unitary shaft support members and the conveyor chain passing over such portions through which said conveyor chain passes from the outside sprockets to within said casing and from within the casing to the outside sprockets thereadjacent to restrict exchange of cold air in said casing with air outside of said casing.

4. A unitary shaft support member for a food freezer comprising, in combination, a pair of vertically extending horizontally spaced apart support members, a top horizontally disposed member fixed at a point spaced in from the ends thereof to said vertical members at a position therealong approximately one-third the length of the vertical members from the top ends thereof, a bottom horizontal member parallel to said top member fixed at a point spaced in from the ends thereof to said vertical members at a position approximately one-third the length of the vertical members from the bottom ends thereof, bracket means supporting each end of one of the vertical support members in a selected fixed position with respect to said bracket means, the other of said vertical members having bracket means at each end slidably supporting the ends of the support member for horizontal movement on contraction and expansion of said unit, first shaft bearing members mounted on the top and bottom horizontally disposed members intermediate an end and the adjacent vertical support, a first shaft mounted in said first bearing members, second shaft bearing members mounted on the top and bottom horizontally extending members intermediate the other end and the other vertical support, at least one pair of said first and second bearing members being adjustably mounted on said top and bottom horizontal members, a second shaft mounted in said second shaft bearing members, spaced apart sprockets mounted on said shafts adjacent the ends thereof and intermediate said top and bottom horizontal members and an endless chain trained over said sprockets, whereby any sprocket on the shafts is positioned relatively close to a bearing support for the shaft and the bending moments between sprockets and bearings along said shaft are reduced as compared with the bending moments of spaced sprockets and bearings had the bearings been positioned at each end of each shaft.

5. A unitary shaft support member for a food freezer according to claim 4 wherein said first and second bearing members are adjustably mounted on the top and bottom horizontal members and including screw members attached to each of said vertical support members and movable against said adjacent first and second bearing means to hold them in adjusted position along the top and bottom horizontal members.

6. A baffle apparatus for use in a housing and with an endless conveyor system therein having front and rear unitary shaft support members mounted therein having spaced apart sprockets thereon about which the endless conveyor is trained, a first outside sprocket about which said conveyor travels in entering said housing to a first inside sprocket on the rear unitary shaft support member, a next to last inside sprocket and a last inside sprocket on said front unit shaft support over which said chain travels in leaving said housing and a second outside sprocket about which said chain travels after leaving said casing, said baffle apparatus comprising a duct seal unit for the endless conveyor for sealing the inside from the outside of the housing to prevent exchange of air from within and without said casing, said duct sealing unit comprising a main section, a first transverse section affixed to one end of but not in communication with said main section and extending substantially transverse thereto, and a second transverse section attached to and in communication with said main section, said first transverse section having an inlet opening exposed to the air outside said casing to receive the first reach of said chain with said casing from adjacent said first outside sprocket and a second opening at the other end adjacent said first inside sprocket exposed to the air inside said casing, said last-mentioned opening facing in the direction of the air movement thereadjacent in said housing so that the air moves thereby, but not therein, said second transverse section being affixed and in communication with the main section at the other end thereof, said main and second transverse sections housing the last reaches of said chain as it leaves said casing, said main section having an opening therein adjacent said next to last inside sprocket and adjacent the end thereof proximal to said first transverse section with the axis of the opening extending perpendicular to the axis of said second opening in the first transverse section so that air flow in said casing moves therepast but not therein said second opening in the first transverse section and the opening in the main section being close to each other within the casing and subject to substantially the same pressure and temperature conditions within said casing, said second transverse section being adapted to house the last inside sprocket and the last reach of the chain as it leaves said casing and having an opening exposed to the air outside said casing, said second opening in the first transverse section and the opening in the main section being exposed to the same pressure conditions and balancing each other while said inlet opening in the first transverse section and the opening in the second transverse section are exposed to the same pressure outside said casing thereby balancing each other whereby the minimum amount of inside and outside air is exchanged through said baffle apparatus.

7. In a food freezing machine, a housing, a plurality of unitary shaft support members mounted therein, having spaced apart sprockets about which an endless conveyor chain is trained, each of said unitary shaft support members comprising a pair of vertical extending horizontally spaced apart support members, a top horizontally disposed member fixed at a point adjacent the ends thereof, a bottom horizontal member parallel to said top member fixed to said vertical members adjacent their bottom ends, one of said vertical members being fixed at its ends to said housing, the other of said vertical members being slidably supported at its ends in said housing for horizontal movement on contraction and expansion of said unit, first shaft bearing members mounted on the top and bottom members intermediate an end and the adjacent vertical support, a first shaft mounted in said first bearing members for free rotation, second shaft bearing members mounted on the top and bottom members intermediate the other end and the other vertical support, a second shaft mounted in said second shaft bearing members, and spaced apart sprockets mounted on said shafts adjacent the ends thereof and intermediate said top and bottom horizontal members.

References Cited in the file of this patent

UNITED STATES PATENTS

| 1,955,669 | Botz | Apr. 17, 1934 |
| 2,677,943 | Nelson et al. | May 11, 1954 |